US 7,513,229 B2

(12) United States Patent
Miyakoshi et al.

(10) Patent No.: US 7,513,229 B2
(45) Date of Patent: Apr. 7, 2009

(54) APPARATUS FOR AND METHOD OF CONTROLLING VARIABLE VALVE MECHANISM

(75) Inventors: Ryo Miyakoshi, Isesaki (JP); Kenichi Machida, Isesaki (JP); Takahiro Yoshino, Yokosuka (JP); Masahiro Arai, Yokohama (JP); Hatsuo Nagaishi, Zushi (JP)

(73) Assignee: Hitachi, Ltd., Tokyo (JP)

( * ) Notice: Subject to any disclaimer, the term of this patent is extended or adjusted under 35 U.S.C. 154(b) by 6 days.

(21) Appl. No.: 11/657,728

(22) Filed: Jan. 25, 2007

(65) Prior Publication Data

US 2007/0186885 A1 Aug. 16, 2007

(30) Foreign Application Priority Data

Jan. 26, 2006 (JP) ............................. 2006-017066

(51) Int. Cl.
*F01L 1/34* (2006.01)
(52) U.S. Cl. ................. 123/90.16; 123/90.15
(58) Field of Classification Search ............... 123/90.15, 123/90.16, 90.17
See application file for complete search history.

(56) References Cited

U.S. PATENT DOCUMENTS

| 7,107,140 B2 | 9/2006 | Yoshino et al. |
| 2006/0075996 A1* | 4/2006 | Yoshino et al. ........ 123/568.14 |

FOREIGN PATENT DOCUMENTS

| CN | 1757895 A | 4/2006 |
| JP | 2004-340013 | 12/2004 |

OTHER PUBLICATIONS

Chinese Office Action for Chinese Patent Application No. 200710008240.6, dated Jun. 27, 2008, 6 pgs.

* cited by examiner

*Primary Examiner*—Zelalem Eshete
(74) *Attorney, Agent, or Firm*—Foley & Lardner LLP (57) ABSTRACT

At the time of obtaining a difference in intake air amount between right and left banks in a V-type engine, a target value of a lift-amount/operation-angle-varying mechanism provided for each of the banks is set to a target value at which flow velocity of intake air passing through an intake valve becomes almost sound velocity. In a state in which the flow velocity of intake air passing through the intake valve becomes almost sound velocity, a difference in the intake air amount in the right and left banks is detected and, to reduce the difference, a correction value for a target value of a valve lift is set for each of the banks.

20 Claims, 6 Drawing Sheets

APPARATUS FOR AND METHOD OF CONTROLLING VARIABLE VALVE MECHANISM

BACKGROUND OF THE INVENTION

1. Field of the Invention

The present invention generally relates to an apparatus for and a method of controlling a variable valve mechanism of an internal combustion engine and, more particularly, relates to a technique for correcting an open characteristic of an intake valve in accordance with an amount of air passing through the intake valve of an internal combustion engine having a variable valve mechanism for varying the open characteristic of the intake valve.

2. Description of the Related Art

Japanese Unexamined Patent Publication No. 2004-340013 discloses an internal combustion engine having a lift-amount/operation-angle-varying mechanism for continuously varying a lift amount and an operation angle of an intake valve and a phase-varying mechanism for continuously varying a center phase of the operation angle of the intake valve.

The publication also discloses such a technique that, when the intake valve is operated in a region in which the operation angle is lower than a threshold, a correction value for correcting a target operation angle is set, and when the intake valve is operated in a region in which the operation angle is equal to or larger than the threshold, a correction value for correcting a target center phase is set.

However, since an intake air amount changes due to the negative pressure in an intake pipe and the timing of closing an intake valve, even if the region in which a variation in the intake air amount is detected is limited to a low-speed/low-load region, it is difficult to accurately detect any variation in the intake air amount caused by the lift-amount/operation-angle-varying mechanism.

SUMMARY OF THE INVENTION

An object of the present invention is to enable an accurate detection of a variation in an intake air amount caused by a lift-amount/operation-angle-varying mechanism of an internal combustion engine without being largely influenced by negative pressure in an intake pipe and a timing of closing an intake valve.

To achieve the object, in accordance with the present invention, when a condition that flow velocity of intake air that passes through an intake valve of an internal combustion engine becomes almost sound velocity is satisfied, an amount of air passing through the intake valve is detected and, on the basis of the detected passing air amount, a correction value correcting the open characteristic of the intake valve is set for controlling the operation of the lift-amount/operation-angle varying mechanism.

The other objects, features, and advantages of this invention will become understood from the following description with reference to the accompanying drawings.

DESCRIPTION OF THE PREFERRED EMBODIMENTS

Figure 1:
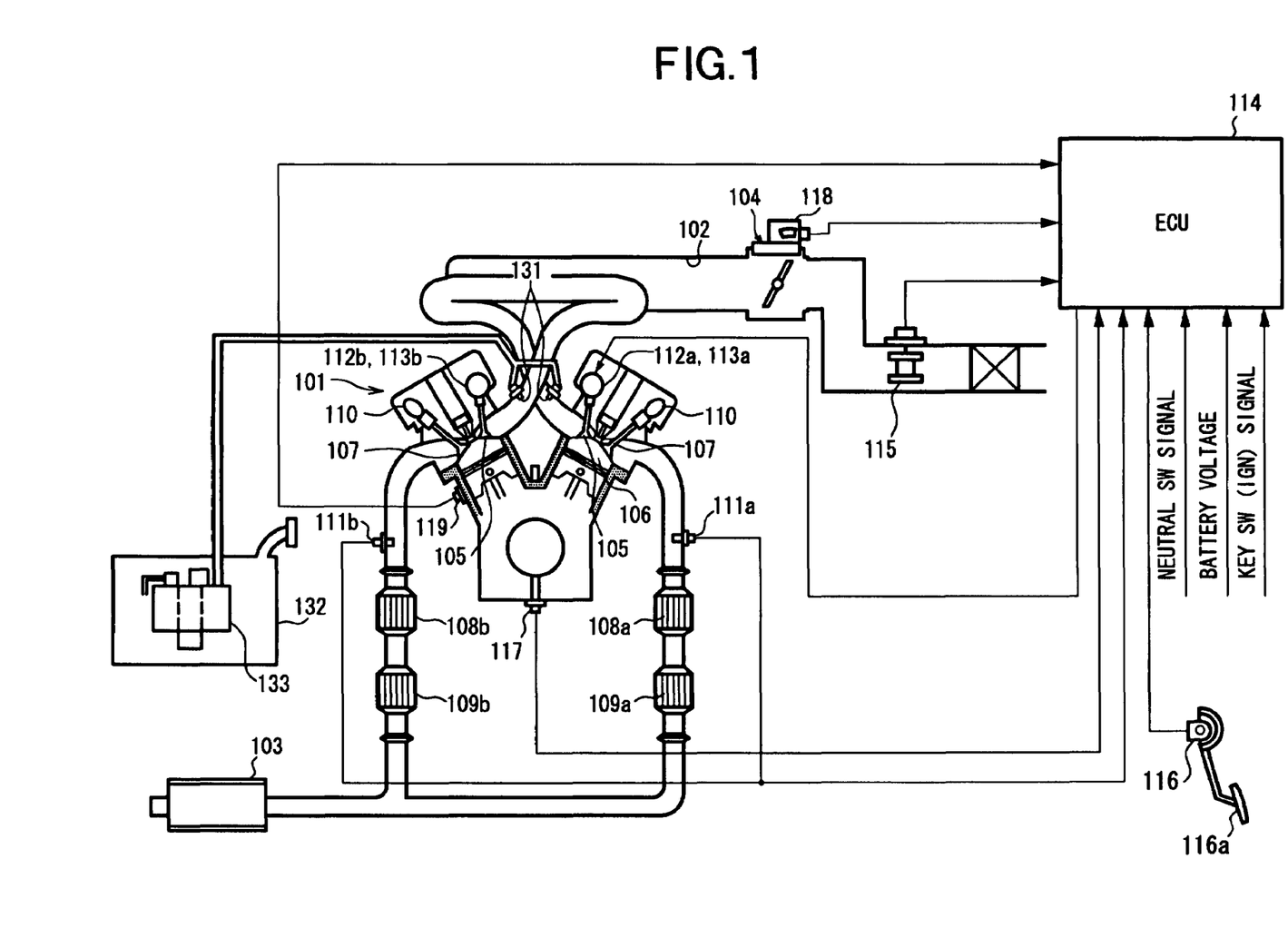
FIG. 1 is a system diagram of an internal combustion engine to which the present invention is applied.

FIG. 1 is a system configuration diagram illustrating an internal combustion engine for a vehicle and an electronic control unit.

An internal combustion engine 101 is a V-type engine comprised of right and left banks.

An electronically-controlled throttle 104 is disposed in an intake pipe 102 of the engine 101.

Air passed through electronically-controlled throttle 104 is distributed to the banks and is further distributed to cylinders.

In each of the cylinders, air is sucked into a combustion chamber 106 via an intake valve 105.

Combustion gas in combustion chamber 106 is exhausted via an exhaust valve 107, collected on each of the banks, and purified by front catalytic converters 108a and 108b and rear catalytic converters 109a and 109b provided for the banks.

The exhausts of the banks after the purification by rear catalytic converters 109a and 109b are join together, and flow in a muffler 103 and, after that, exhausted to the atmosphere.

Exhaust valve 107 is opened/closed by a cam axially supported by a camshaft 110, with maintaining a predetermined valve lift amount, a valve operation angle, and a valve timing.

On the other hand, the lift amount of intake valves 105 is continuously varied together with the operation angle by lift-amount/operation-angle-varying mechanisms 112a and 112b provided for the two banks.

Further, the center phase of the operation angle of intake valve 105 is continuously varied by valve-timing-varying mechanisms 113a and 113b provided for both banks.

An electronic control unit (ECU) 114 incorporating therein a microcomputer controls electronically-controlled throttle 104, lift-amount/operation-angle-varying mechanisms 112a and 112b, and valve-timing-varying-mechanisms 113a and 113b on the basis of a target intake negative pressure and a target intake air amount.

To electronic control unit 114, signals are inputted from an airflow meter 115 for detecting an intake air flow rate of engine 101, an accelerator pedal sensor 116 for detecting a stroke amount of an accelerator pedal 116a, a crank angle sensor 117 for detecting an rotation angle of a crankshaft by detecting a plurality of sections to be detected, which are provided in predetermined angle positions of a signal plate axially supported by the crankshaft, a throttle sensor 118 for detecting an opening angle TVO of throttle valve 103b by a potentiometer, a water temperature sensor 119 for detecting temperature of cooling water of engine 101, and air-fuel-ratio sensors 111a and 111b provided on the upstream side of front catalytic converters 108a and 108b, respectively, and outputting detection signals each according to oxygen concentration in exhaust gas correlated to the air-fuel ratio of a combustion mixture.

A fuel injection valve 131 is provided in an intake port on the upstream side of intake valves 105 of the cylinders.

Fuel in a fuel tank 132 is pumped by a fuel pump 133 to fuel injection valve 131.

Fuel injection valve 131 injects the fuel of an amount proportional to the pulse width of an injection pulse signal outputted from electronic control unit 114.

The structures of lift-amount/operation-angle-varying mechanisms 112a and 112b and valve-timing-varying mechanisms 113a and 113b will be described with reference to FIGS. 2 through 4.

In V-type engine 101 of the present embodiment, a pair of intake valves 105, 105 is provided for each of the cylinders, and an intake valve drive shaft 3 rotatably driven by the crankshaft is supported along a cylinder line direction above intake valves 105, 105.

An oscillating cam 4 being kept in contact with a valve lifter 2a of intake valve 105 and opening/closing intake valve 105 is fit onto intake valve drive shaft 3 so as to be relatively rotatable.

Between intake valve drive shaft 3 and oscillating cam 4, lift-amount/operation-angle-varying mechanisms 112a and 112b for continuously changing the operation angle and the valve lift amount of intake valve 105 are provided.

At one end of intake valve drive shaft 3, valve-timing-varying-mechanisms 113a and 113b are provided, which continuously change the center phase of the operation angle of intake valve 105 by changing the rotation phase of intake valve drive shaft 3 relative to crankshaft.

Figure 2:
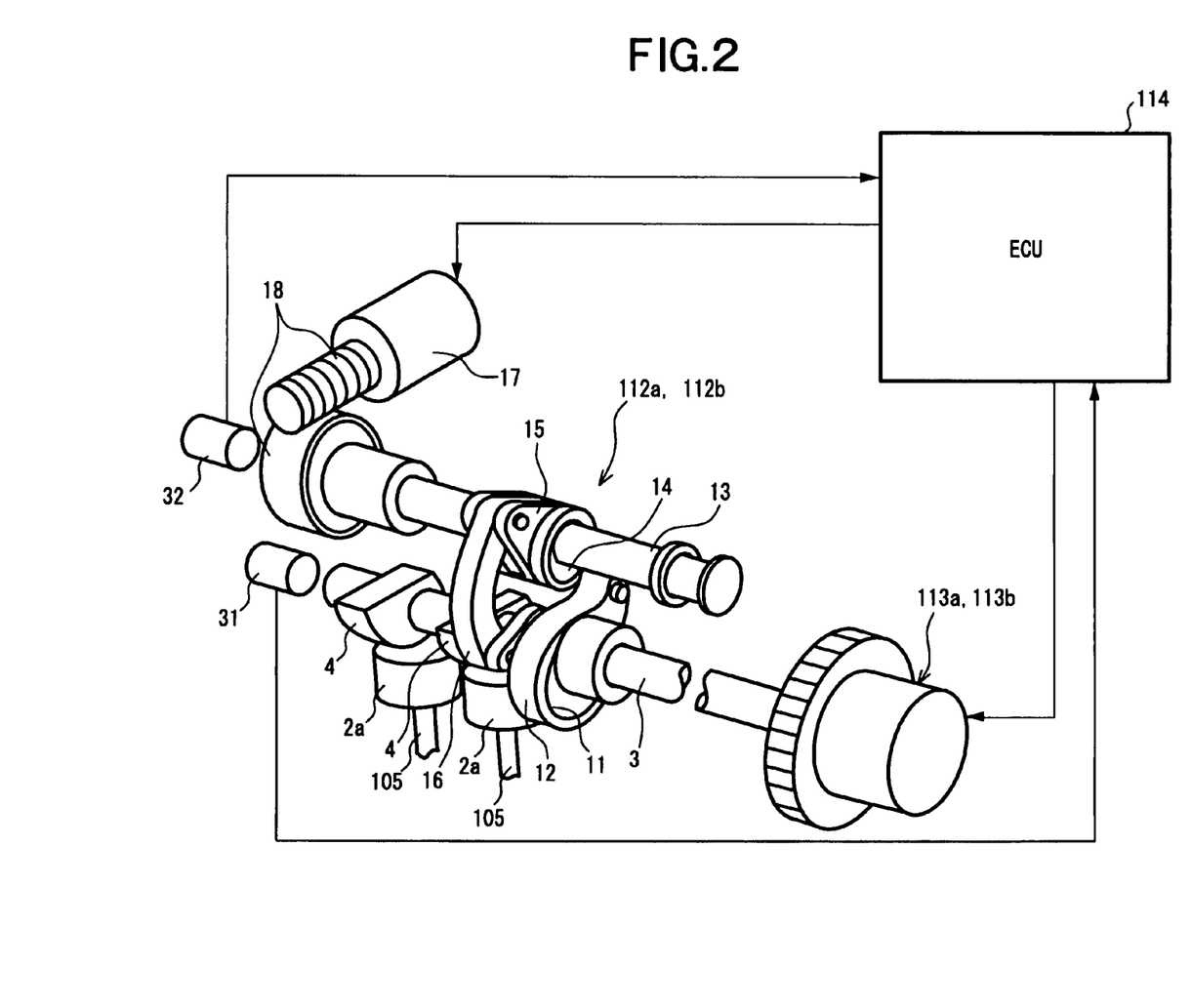
FIG. 2 is a perspective view showing a lift-amount/operation-angle-varying mechanism provided for the internal combustion engine.
Figure 3:
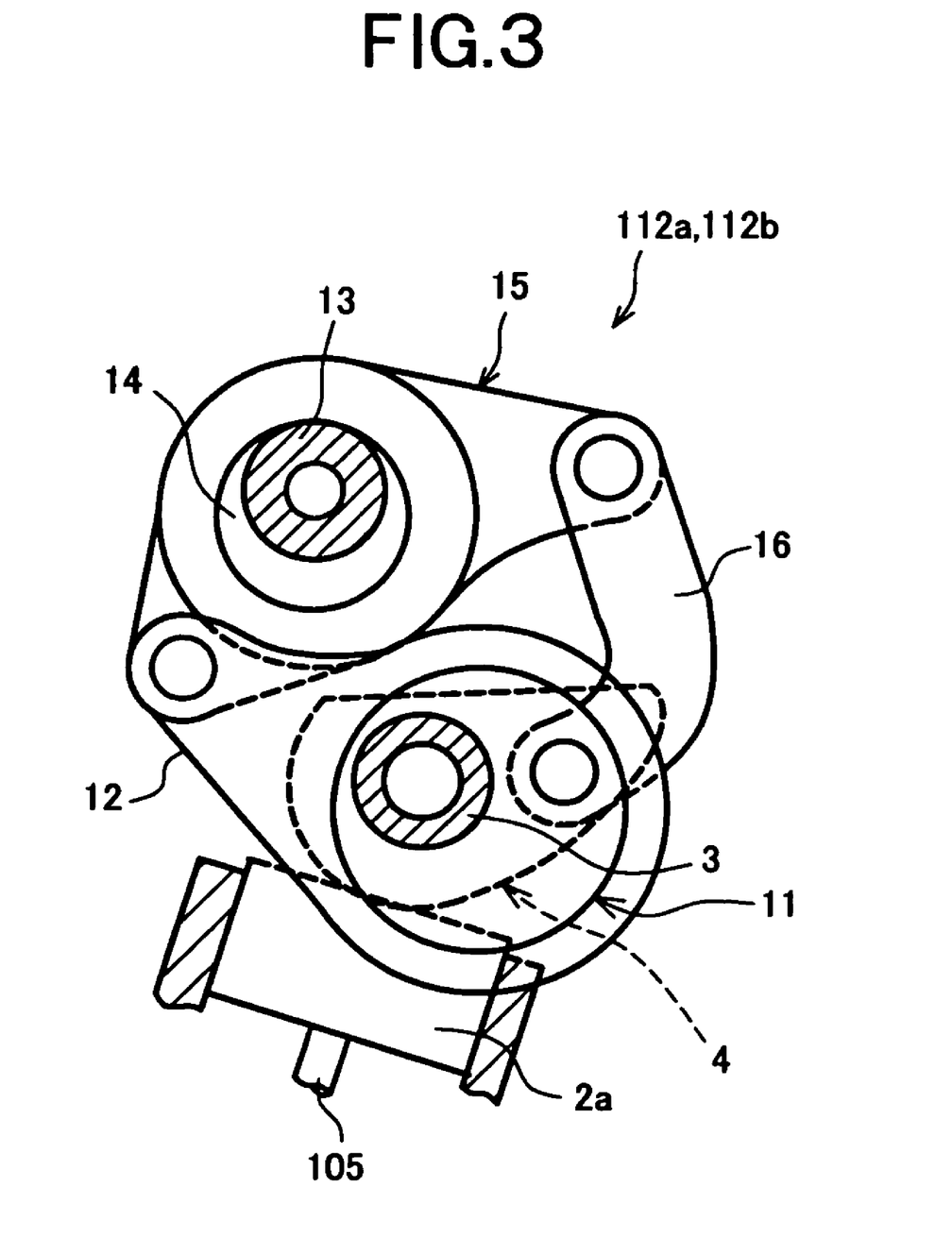
FIG. 3 is a side view of the lift-amount/operation-angle-varying mechanism.

As shown in FIGS. 2 and 3, each of lift-amount/operation-angle-varying mechanisms 112a and 112b has a circular drive cam 11 eccentrically and fixedly provided for intake valve drive shaft 3, a ring-shaped link 12 fit onto drive cam 11 so as to be relatively rotatable, a control shaft 13 extending in the cylinder line direction of each bank in almost parallel with intake valve drive shaft 3, a circular control cam 14 eccentrically and fixedly provided for control shaft 13, a rocker arm 15 relatively rotatably fit onto control cam 14 to have one end thereof which is coupled to the tip of ring-shaped link 12, and a rod-shaped link 16 coupled to the other end of rocker arm 15 and oscillating cam 4.

A rotational drive force of a motor 17 is applied, via gears 18, to control shaft 13 and thus, control shaft 13 turns within a predetermined angular range regulated by a stopper.

With the above configuration, when intake valve drive shaft 3 rotates in association with the crankshaft, ring-shaped link 12 performs an approximately translatory motion via drive cam 11, and rocker arm 15 rocks around the axis of control cam 14 to cause an oscillation of each oscillating cam 4 via rod-shaped link 16, by which each of intake valves 105 is driven to do its lifting and lowering motions.

By changing the rotation angle of control shaft 13, the axis position of control cam 14 as the rocking center of rocker arm 15 changes, and the posture of oscillating cam 4 changes.

Consequently, while the center phase of the operation angle of intake valve 105 is substantially constant, the operation angle and the valve lift amount of intake valve 105 continuously change.

Specifically, when control shaft 13 is rotated in one direction, the lift amount continuously increases and, simultaneously, the operation angle continuously increases. When control shaft 13 is rotated in the opposite direction, the lift amount continuously decreases and, simultaneously, the operation angle continuously decreases.

A detection signal from an angle sensor 32 for detecting the rotation angle of control shaft 13 is inputted to electronic control unit 114. Motor 17 is feedback-controlled so that actual angle detected by angle sensor 32 becomes close to a target rotation angle of control shaft 13 corresponding to a target value of the valve lift amount.

Figure 4:
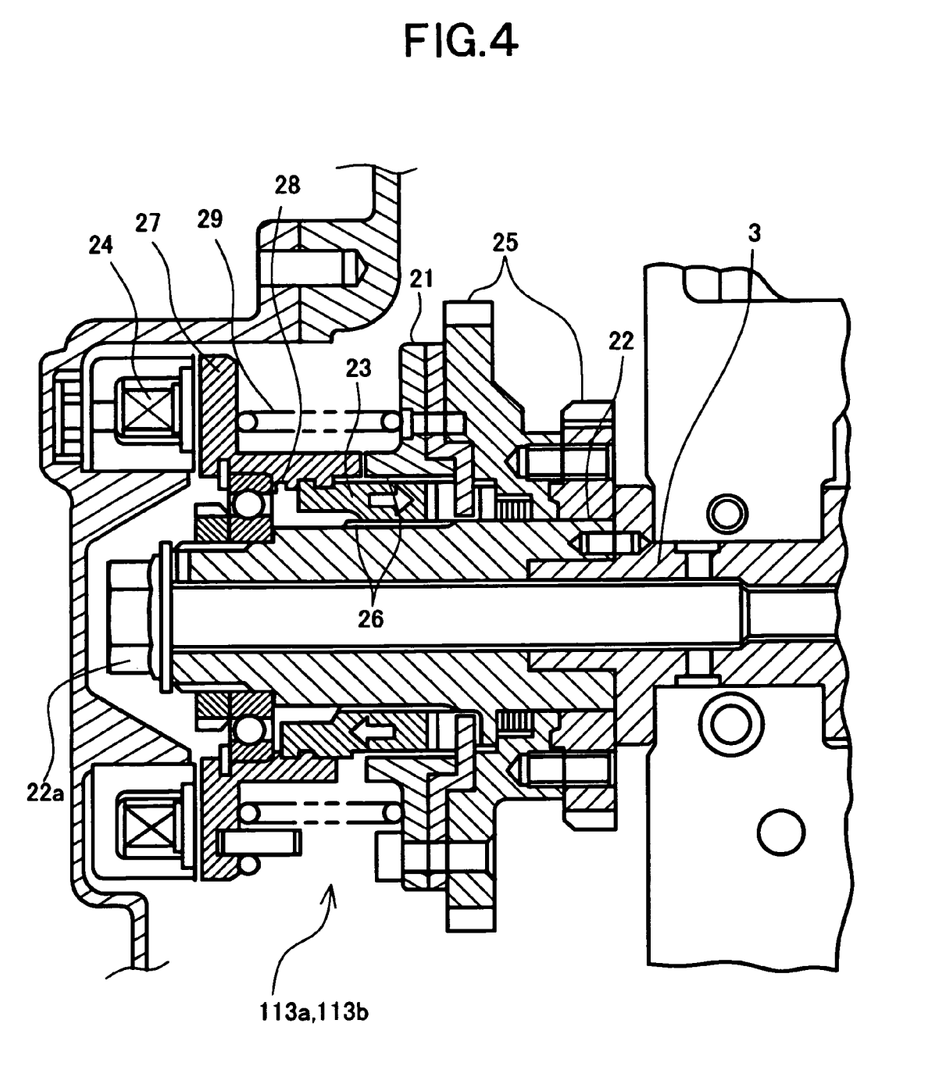
FIG. 4 is a cross section showing a valve-timing-varying mechanism provided for the internal combustion engine.

FIG. 4 shows valve-timing-varying mechanisms 113a and 113b.

Each of valve-timing-varying mechanisms 113a and 113b has a first rotator 21 fixed to a sprocket 25 rotating synchronously with the crankshaft and rotating integrally with sprocket 25, a second rotator 22 fixed to one end of intake valve drive shaft 3 by a bolt 22a and rotating integrally with intake valve drive shaft 3, and a cylindrical intermediate gear 23 which engages with an inner peripheral surface of first rotator 21 and an outer peripheral surface of second rotator 22 by a helical spline 26.

A drum 27 is coupled to intermediate gear 23 via a triple thread 28, and a torsion spring 29 is disposed between drum 27 and intermediate gear 23.

Intermediate gear 23 is spring biased to the retard direction (left direction in FIG. 4) by torsion spring 29. When a voltage is applied to an electromagnetic retarder 24 to generate a magnetic force, intermediate gear 23 is moved toward the advance direction (right direction in FIG. 4) via drum 27 and triple thread screw 28.

According to the position in the axial direction of intermediate gear 23, the relative phases of rotators 21 and 22 change, the phase of intake valve drive shaft 3 relative to the crankshaft changes, and the center phase of the operation angle of intake valve 105 continuously changes.

Motor 17 and electromagnetic retarder 24 are controlled by a control signal from electronic control unit 114.

To electronic control unit 114, a detection signal from crank angle sensor 117 and a detection signal outputted at every predetermined angle position of intake valve drive shaft 3 from a cam sensor 31, are inputted.

The phase difference from a reference crank angle position detected by crank angle sensor 117 to a reference cam angle position detected by cam sensor 31 is detected, and current passage to electromagnetic retarder 24 is feedback-controlled so that the phase difference becomes close to a target value.

In the case where each of the banks is provided with lift-amount/operation-angle-varying mechanisms 112a and 112b as described above, an intake air amount varies among the banks caused by a variation in the operation of lift-amount/operation-angle-varying mechanisms 112a and 112b, and stability of engine speed and quietness of the engine may deteriorate.

Therefore, electronic control unit 114 has the function of setting a correction value for correcting the control amount of lift-amount/operation-angle-varying mechanisms 112a and 112b for each of the banks in order to reduce a difference in an amount of the intake air among the banks.

In the following, setting of the correction value will be described in detail with reference to the flowchart of FIG. 5.

Figure 5:
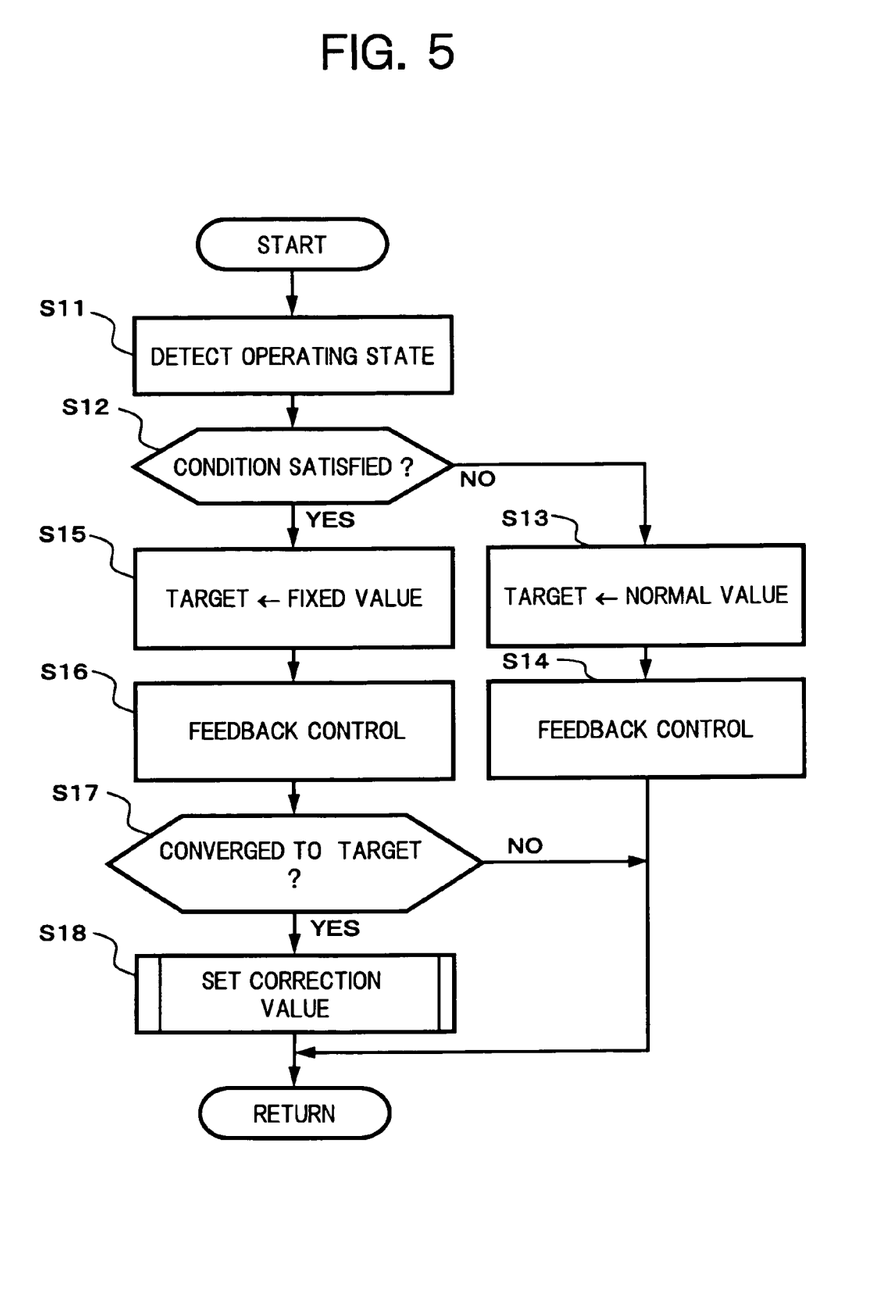
FIG. 5 is a flowchart showing an example of a control according to the present invention.

The routine shown in the flowchart of FIG. 5 is executed every predetermined short time. First, in step S11, various operating conditions are detected.

In the following step S12, whether all of the following three conditions (1) through (3) are satisfied or not is determined from the detection result in the step S11.

(1) Engine 101 is in a steady driving mode.

(2) Lift-amount/operation-angle-varying mechanisms 112a and 112b and valve timing varying mechanisms 113a and 113b are in the steady mode.

(3) The lift amount (operation angle) of intake valve 105 is controlled to a predetermined value or less in a normal control mode of lift-amount/operation-angle-varying mechanisms 112a and 112b.

From the conditions (1) and (2), it is determined whether the intake air amount of engine 101 is in the stable state. From the condition (3), it is determined whether a condition is the condition that switching of a target lift amount which will be described later does not exert a large influence on operability.

In the case where at least one of the three conditions is not satisfied, electronic control unit 114 proceeds to step S13 and sets a normal control target of lift-amount/operation-angle-varying mechanism 112a and 112b from the target intake air amount or the like. In the following step S14, lift-amount/operation-angle-varying mechanisms 112a and 112b are controlled in accordance with the normal control target.

On the other hand, when all of the three conditions (1) through (3) are satisfied, electronic control unit 114 proceeds to step S15.

In the step S15, a target value of the valve lift in lift-amount/operation-angle-varying mechanisms 112a and 112b is switched from a normal target value which is set variably in accordance with the engine operating conditions, to a fixed value which is preliminarily stored as a specified value used at the time of detecting a difference in the amount of the intake air among the banks.

In the following step S16, lift-amount/operation-angle-varying mechanisms 112a and 112b are controlled on the basis of the fixed value.

It should be noted that the fixed value is smaller than the normal target value. When lift-amount/operation-angle-varying mechanisms 112a and 112b is controlled on the basis of the fixed value, the lift amount and the operation angle of intake valve 105 is made smaller than the normal values and as a result, the flow velocity of the intake air passing through intake valve 105 becomes almost sound velocity.

At this stage, the above-mentioned fixed value may be used as the minimum lift amount.

Further, a reduction in the intake air amount caused by decrease of the target value of the valve lift from the normal target value to the fixed value is cancelled out by a correction made to increase the opening angle of electronically-controlled throttle 104 (throttle valve). Hence, it is possible to avoid a large drop in an output of engine 101 by switching of the target value.

Figure 6:
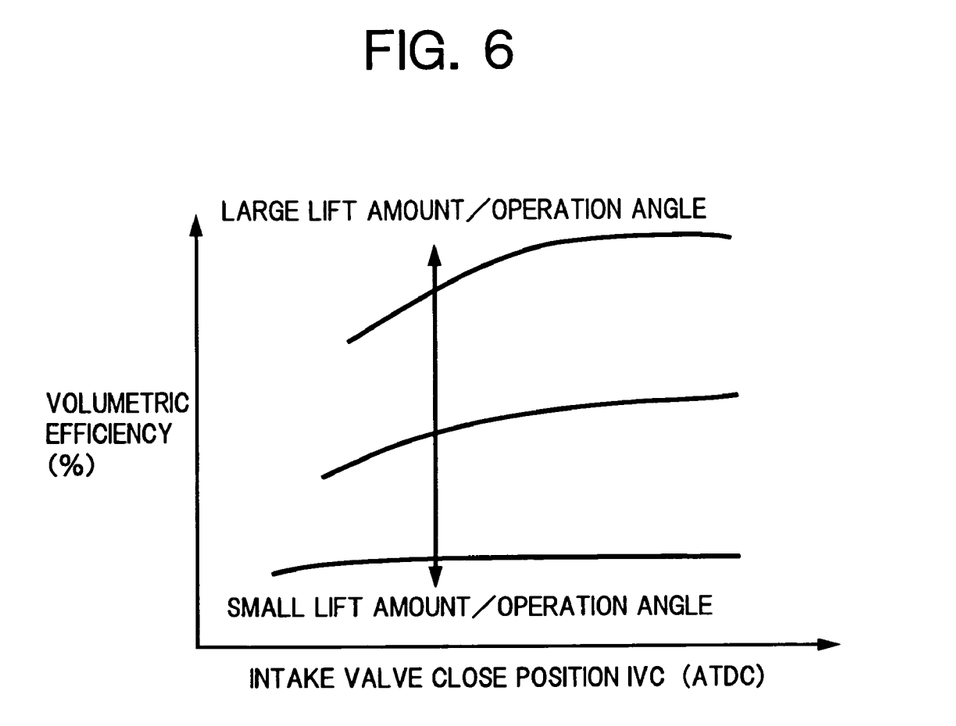
FIG. 6 is a graph showing the correlation between a closing timing of an intake valve and volumetric efficiency (intake air amount) for every valve lift amount.

As described above, when the flow velocity of the air passing through intake valve 105 becomes almost sound velocity, the intake air amount (volumetric efficiency) does not largely fluctuate due to a change in a closing timing IVC of intake valve 105 or due to the influence of the negative pressure in the intake pipe, as shown in FIG. 6.

In contrast, when the flow velocity of the air passing through intake valve 105 becomes slower than sound velocity, as shown in FIG. 6, the intake air amount (volumetric efficiency) largely fluctuates due to a change in the closing timing IVC of intake valve 105.

Therefore, by setting the target value of the valve lift in lift-amount/operation-angle-varying mechanisms 112a and 112b to a value at which the flow velocity of the intake air passing through intake valve 105 becomes almost sound velocity, any variation in the intake air amount caused by the variations of the lift amount and the operation angle can be highly accurately evaluated.

The target value of the valve lift at which the flow velocity of the intake air passing through intake valve 105 becomes almost sound velocity, is a valve lift amount at which the fluctuation band of the cylinder intake air amount (volumetric efficiency) with respect to a change in the closing timing IVC of intake valve 105 becomes equal to or less than an allowable value.

Therefore, it is to be noted that the above-mentioned "almost sound velocity" includes a case where a flow velocity of the intake air passing through intake valve 105 is exact sound velocity and also another case where even a flow velocity is slower than the exact sound velocity, such a flow velocity at which the fluctuation band of the cylinder intake air amount (volumetric efficiency) with respect to a change in the closing timing IVC of intake valve 105 becomes equal to or less than an allowable value.

In step S17, it is determined whether or not the actual lift amount or operation angle of intake valve 105 converges to the fixed. value.

In this case, when the actual angle of control shaft 13 is stable at around the target angle, it is determined that the actual lift amount or operation angle converges to the fixed value.

When it is determined in the step S17 that either the actual lift amount or the operation angle of intake valve 105 converges to the afore-mentioned fixed value, the operation of an electronic control unit 114 proceeds to step S18.

In the step S18, detection of a difference in the intake air amount among the right bank and the left bank is performed.

In the case where each of the right and left banks has an independent intake system and an air flow meter, the difference in the intake air amount between the right and left banks can be detected as a difference in the intake air amounts of the two independent intake systems that are measured by the respective air flow meters.

On the other hand, when the intake air amount of each of the two banks cannot be detected in the manner as described with the present embodiment, the difference between the intake air amount of the right bank and the intake air amount of the left bank can be estimated from a difference either between respective torques or between respective air-fuel ratios that generates due to the difference between the intake air amount in the right bank and the intake air amount in the left bank.

In the case where the intake air amount of engine 101 as a whole is detected by the measuring result of an air flow meter and a fuel injection amount is calculated on the basis of the detection result of the intake air amount, the fuel injection amount is calculated on the assumption that an equal amount of air is distributed to each of the cylinders.

However, when the lift amount or operation angle of intake valve 105 in the right bank and that in the left bank are different from each other due to the variation in the operation of lift-amount/operation-angle-varying mechanisms 112a and 112b provided for the right and left banks, there practically occurs a difference between the intake air amount in the right bank and that in the left bank.

The difference between the intake air amount in the right bank and the intake air amount in the left bank causes a difference between an intake air amount to which the fuel injection amount is adjusted and the actual intake air amount. As a result, the air-fuel ratios of the right and left banks vary from each other and, a torque generated in the right bank and that generated in the left bank differ from each other.

In engine 101, air fuel ratio sensors 111a and 111b are independently provided for respective exhaust systems of the right and left banks, and the air-fuel ratio in each of the two banks can be detected. Therefore, from either one of the air-fuel ratios of the right and left banks detected by air-fuel ratio sensors 111a and 111b, air-fuel-ratio-feedback-correction factors of the banks which are set on the basis of the above-mentioned air-fuel ratios of the right and left banks detected by air-fuel ratio sensors 111a and 111b, and a learnt air-fuel ratio correction value of each bank which is set on the basis of the above-mentioned air-fuel-ratio-feedback-correction factor of each bank, the difference between the air-fuel ratios in the right and left banks can be detected. From the difference between the air-fuel ratios in the right and left banks, the difference in the amount of the intake air between the right and left banks can be estimated.

The difference in the generated torques due to the difference between the intake air amount in the right bank and the intake air amount in the left bank can be also detected on the basis of the angular velocity of the crankshaft.

After the difference between the intake air amount in the right bank and the intake air amount in the left bank is detected in the manner as described above, a correction value for correcting the target value of the valve lift in each of lift-amount/operation-angle-varying mechanisms 112a and 112b is set for each of the banks so as to reduce the difference in the intake air amount.

For example, when the intake air amount of the right bank is larger than that in the left bank, the correction value for the left bank is updated so as to increase the valve lift of the left bank and/or the correction value for the right bank is updated so as to decrease the valve lift of the right bank.

On the other hand, when the intake air amount of the left bank is larger than that in the right bank, the correction value for the right bank is updated so as to increase the valve lift of the right bank and/or the correction value for the left bank is updated so as to decrease the valve lift of the left bank.

When the target value of the valve lift in each of the banks is corrected with the correction value, the difference in the intake air amount between both banks caused by variations in-lift-amount/operation-angle-varying mechanisms 112a and 112b can be reduced, and stability and quietness of engine 101 can be surely acquired.

Although the V-type engine is used as engine 101 in the foregoing embodiment, engine 101 may be a horizontally opposed engine or W-type engine. Further, in the case of learning the correlation between the lift amount of intake valve 105 and the intake air amount, engine 101 is not limited to an engine having a plurality of banks. The present invention can be also applied to a straight engine.

The entire contents of Japanese Patent Application No. 2006-017066, filed Jan. 26, 2006 are incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

We claim:

1. An apparatus for controlling a variable valve mechanism provided for varying an open characteristic of an intake valve of an internal combustion engine, comprising:
    a first control unit configured to control the variable valve mechanism in accordance with operating conditions of the internal combustion engine;
    a second control unit that controls the open characteristic of the intake valve to such an open characteristic that a flow velocity of intake air passing through the intake valve becomes almost sound velocity;
    a detecting unit configured to detect an amount of air passing through the intake valve, when the open characteristic of the intake valve is controlled by the second control unit;
    a setting unit configured to set a correction value for correcting the open characteristic of the intake valve, on the basis of the detected amount of the passing air; and
    a correcting unit configured to correct a control operation performed by the first control unit on the basis of the correction value.

2. The apparatus for controlling a variable valve mechanism according to claim 1, wherein when a control operation performed by the second control unit converges, the detecting unit detects the amount of air passing through the intake valve.

3. The apparatus for controlling a variable valve mechanism according to claim 1, wherein the second control unit switches a target value of the variable valve mechanism from a normal target value to a target value at which flow velocity of the intake air becomes the almost sound velocity, and corrects the opening of a throttle valve of the internal combustion engine to thereby decrease a change in the intake air amount in response to the switch of the target value.

4. The apparatus for controlling a variable valve mechanism according to claim 1, wherein the second control unit switches a target value of the variable valve mechanism from a normal target value to a target value at which flow velocity of the intake air becomes the almost sound velocity under condition that the variable valve mechanism is controlled by a normal control to a predetermined low flow rate state of the intake air.

5. The apparatus for controlling a variable valve mechanism according to claim 1, wherein the variable valve mechanism is a mechanism that continuously varies a lift amount and an operation angle of the intake valve.

6. The apparatus for controlling a variable valve mechanism according to claim 1, wherein the setting unit sets the correction value on the basis of an amount of air passing through the intake valve that is detected in a steady state of the internal combustion engine.

7. The apparatus for controlling a variable valve mechanism according to claim 1, wherein the setting unit sets the correction value on the basis of an amount of air passing through the intake valve that is detected in a steady state of the variable valve mechanism.

8. An apparatus for controlling a variable valve mechanism, provided for varying an open characteristic of an intake valve of an internal combustion engine, which internal combustion engine includes a plurality of banks, each having the variable valve mechanism, the apparatus comprising:
    a control unit configured to control the variable valve mechanism for each of the banks in accordance with operating conditions of the internal combustion engine;
    a first detecting unit configured to detect a condition that a flow velocity of intake air passing through the intake valve becomes almost sound velocity;
    a second detecting unit configured to detect a difference in intake air amount among the plurality of banks under the condition that the flow velocity of intake air passing through the intake valve becomes the almost sound velocity;
    a setting unit configured to set, for each of the banks, a correction value for correcting the open characteristic of the intake valve, on the basis of the difference in the intake air amount; and
    a correcting unit configured to correct the control of the variable valve mechanism for each of the banks.

9. The apparatus for controlling a variable valve mechanism according to claim 8, wherein the second detecting unit detects a difference in air-fuel ratios among the plurality of banks and estimates a difference in the intake air amount among the plurality of banks from the difference in the air-fuel ratios.

10. An apparatus for controlling a variable valve mechanism provided for varying an open characteristic of an intake valve of an internal combustion engine, comprising:
- first control means for controlling the variable valve mechanism in accordance with operating conditions of the internal combustion engine;
- second control means for controlling the open characteristic of the intake valve to such an open characteristic that a flow velocity of intake air passing through the intake valve becomes almost sound velocity;
- detecting means for detecting an amount of air passing through the intake valve, when the open characteristic of the intake valve is controlled by the second control means;
- setting means for setting a correction value for correcting the open characteristic of the intake valve on the basis of the detected amount of the passing air; and
- correcting means for correcting a control operation performed by the first control means on the basis of the correction value.

11. A method of controlling a variable valve mechanism for varying an open characteristic of an intake valve of an internal combustion engine, the method comprising the steps of:
- controlling the open characteristic of the intake valve to an open characteristic in which flow velocity of intake air passing through the intake valve becomes the almost sound velocity;
- detecting an amount of air passing through the intake valve, when the open characteristic of the intake valve is controlled to an open characteristic in which flow velocity of intake air passing through the intake valve becomes the almost sound velocity;
- setting a correction value for correcting the open characteristic of the intake valve on the basis of the detected amount of the passing air; and
- correcting operation of the variable valve mechanism on the basis of the correction value.

12. The method of controlling a variable valve mechanism according to claim 11, wherein the step of detecting an amount of air passing through the intake valve includes the step of detecting an amount of air passing through the intake valve, when the open characteristic of the intake valve converges to the open characteristic with which the flow velocity becomes the almost the sound velocity.

13. The method of controlling a variable valve mechanism according to claim 11, wherein the step of controlling the open characteristic of the intake valve to the open characteristic that the flow velocity becomes almost the sound velocity includes the steps of: switching a target value of the variable valve mechanism from a normal target value to a target value at which flow velocity of the intake air becomes almost sound velocity; and correcting the opening of a throttle valve of the internal combustion engine to thereby decrease a change in the intake air amount in response to the switching of the target value.

14. The method of controlling a variable valve mechanism according to claim 11, wherein the step of controlling the open characteristic of the intake valve to the open characteristic that the flow velocity becomes the almost sound velocity includes the steps of: determining whether the variable valve mechanism is controlled to a predetermined low flow rate state by a normal control or not; and switching a target value of the variable valve mechanism from a normal target value to a target value at which flow velocity of the intake air becomes almost sound velocity, when the variable valve mechanism is controlled to the low flow rate state.

15. The method of controlling a variable valve mechanism according to claim 11, wherein the variable valve mechanism is a mechanism that continuously varies a lift amount and an operation angle of the intake valve.

16. The method of controlling a variable valve mechanism according to claim 11, wherein the step of setting the correction value comprises the steps of: determining whether the internal combustion engine is in a steady state or not; and setting the correction value on the basis of a passing air amount detected in the steady state of the internal combustion engine.

17. The method of controlling a variable valve mechanism according to claim 11, wherein the step of setting the correction value comprises the steps of: determining whether or not the variable valve mechanism is in a steady state; and setting the correction value on the basis of a passing air amount detected in the steady state of the variable valve mechanism.

18. A method of controlling a variable valve mechanism for varying an open characteristic of an intake valve of an internal combustion engine, which internal combustion engine includes a plurality of banks, each having the variable valve mechanism. the method comprising the steps of:
- detecting such a condition that a flow velocity of intake air passing through the intake valve becomes almost sound velocity;
- detecting a difference in intake air amount among the plurality of banks under the condition that the flow velocity of intake air passing through the intake valve becomes the almost sound velocity;
- setting, for each of the banks, a correction value for correcting the open characteristic of the intake valve, on the basis of the difference in the intake air amount; and
- correcting the control of the variable valve mechanism for each of the banks on the basis of the correction value.

19. The method of controlling a variable valve mechanism according to claim 18, wherein the step of detecting a difference in intake air amount among the plurality of banks comprises the steps of: detecting a difference in air-fuel ratios among the plurality of banks; and estimating a difference in the intake air amount among the plurality of banks from the difference in the air-fuel ratios.

20. An apparatus for controlling a variable valve mechanism provided for varying an open characteristic of an intake valve of an internal combustion engine, which internal combustion engine includes a plurality of banks, each having the variable valve mechanism, the apparatus comprising:
- control means for controlling the variable valve mechanism for each of the banks in accordance with operating conditions of the internal combustion engine;
- first detecting means for detecting a condition that a flow velocity of intake air passing through the intake valve becomes almost sound velocity;
- second detecting means for detecting a difference in intake air amount among the plurality of banks under the condition that the flow velocity of intake air passing through the intake valve becomes the almost sound velocity;
- setting means for setting, for each of the banks, a correction value for correcting the open characteristic of the intake valve, on the basis of the difference in the intake air amount; and
- correcting means for correcting the control of the variable valve mechanism for each of the banks.

* * * * *